(12) United States Patent
Hayashida et al.

(10) Patent No.: US 12,460,288 B2
(45) Date of Patent: Nov. 4, 2025

(54) PLATED STEEL SHEET

(71) Applicant: NIPPON STEEL CORPORATION, Tokyo (JP)

(72) Inventors: Shota Hayashida, Tokyo (JP); Takuya Mitsunobu, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/711,915

(22) PCT Filed: Dec. 6, 2022

(86) PCT No.: PCT/JP2022/044893
§ 371 (c)(1),
(2) Date: May 21, 2024

(87) PCT Pub. No.: WO2023/135982
PCT Pub. Date: Jul. 20, 2023

(65) Prior Publication Data
US 2025/0003047 A1    Jan. 2, 2025

(30) Foreign Application Priority Data

Jan. 13, 2022 (JP) .................. 2022-003724

(51) Int. Cl.
| | |
|---|---|
| *C23C 2/40* | (2006.01) |
| *B32B 15/01* | (2006.01) |
| *C22C 18/04* | (2006.01) |
| *C22C 21/00* | (2006.01) |
| *C22C 21/02* | (2006.01) |
| *C22C 21/10* | (2006.01) |

(Continued)

(52) U.S. Cl.
CPC .............. *C23C 2/40* (2013.01); *B32B 15/013* (2013.01); *C22C 18/04* (2013.01); *C22C 21/00* (2013.01); *C22C 21/02* (2013.01); *C22C 21/10* (2013.01); *C22C 30/06* (2013.01); *C22C 38/04* (2013.01); *C23C 2/0222* (2022.08); *C23C 2/0224* (2022.08); *C23C 2/04* (2013.01); *C23C 2/06* (2013.01); *C23C 2/12* (2013.01); *C23C 2/20* (2013.01); *C23C 2/29* (2022.08); *B32B 2311/20* (2013.01); *B32B 2311/30* (2013.01)

(58) Field of Classification Search
None
See application file for complete search history.

(56) References Cited

U.S. PATENT DOCUMENTS 11,939,676 B2 *  3/2024  Toba .................. B32B 15/013
2021/0130919 A1   5/2021  Takashima et al.

FOREIGN PATENT DOCUMENTS

WO     2019/093384 A1    5/2019

* cited by examiner

*Primary Examiner* — Daniel J. Schleis
(74) *Attorney, Agent, or Firm* — Renner, Otto, Boisselle & Sklar, LLP

(57) ABSTRACT

This plated steel sheet includes a base steel sheet, a plated layer formed on a surface of the base steel sheet, and an oxide film formed on a surface of the plated layer, the plated layer has a chemical composition containing Sc: 0.000010 to 4.0% in mass %, and has a cross section, in the thickness direction, in which the area fraction of an intermetallic compound phase containing Sc and having an equivalent circle diameter of 5.0 μm or less is 0.1 to 10.0%, and the oxide film has a thickness of 10 nm or more.

3 Claims, 1 Drawing Sheet

(51) Int. Cl.
*C22C 30/06* (2006.01)
*C22C 38/04* (2006.01)
*C23C 2/02* (2006.01)
*C23C 2/04* (2006.01)
*C23C 2/06* (2006.01)
*C23C 2/12* (2006.01)
*C23C 2/20* (2006.01)
*C23C 2/28* (2006.01)

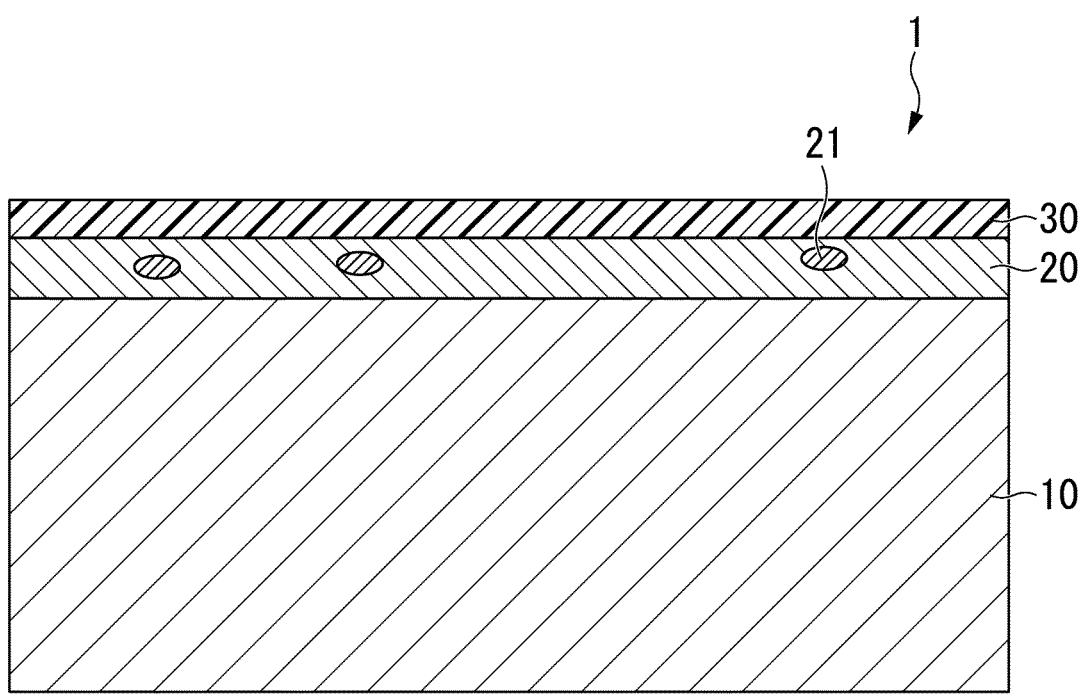

PLATED STEEL SHEET

TECHNICAL FIELD OF THE INVENTION

The present invention relates to a plated steel sheet.

The present application claims priority based on Japanese Patent Application No. 2022-003724 filed in Japan on Jan. 13, 2022, the contents of which are incorporated herein by reference.

RELATED ART

In recent years, suppression of chemical fuel consumption is required for environmental protection and global warming prevention. For example, an automobile as a movement unit indispensable for daily life and activities is no exception to such a request. In response to such a request, for example, improvement of fuel efficiency by vehicle body weight reduction and the like has been studied in automobiles. Most of the structure of an automobile is formed of iron, particularly a steel sheet, and therefore thinning the steel sheet to reduce the weight is highly effective for weight reduction of the vehicle body. However, if the thickness of the steel sheet is simply thinned to reduce the weight of the steel sheet, the strength of the structure is reduced to cause a concern of safety reduction. Therefore, for thinning the thickness of the steel sheet, an increase in the mechanical strength of the steel sheet to be used is required to prevent reduction in the strength of the structure.

Therefore, a steel sheet has been studied and developed in which the mechanical strength of the steel sheet is increased and thus the mechanical strength can be maintained or increased even if the steel sheet is thinner than a previously used steel sheet. Such a steel sheet is required not only in the automobile manufacturing industry but also in various manufacturing industries.

A material having high mechanical strength generally tends to have low shape fixability in forming such as bending, and in the case of processing into a complicated shape, processing itself becomes difficult. Examples of a method for solving the problem of formability include so-called "hot-pressing methods (a hot stamping method, a high temperature pressing method, or a die quenching method)". In these hot-pressing methods, a material to be formed is once heated to a high temperature, and the material softened by the heating is pressed and formed, and cooled after or simultaneously with the forming.

In these hot-pressing methods, a material is once heated to a high temperature and softened, and pressed in a state where the material is softened, so that the material can be easily pressed. Therefore, by the hot pressing, a press-formed article having both good shape fixability and high mechanical strength is obtained. In particular in a case where the material is steel, the mechanical strength of the press-formed article can be increased by the quenching effect due to cooling after the forming.

However, in the case of applying such a hot-pressing method to a steel sheet, for example, iron or the like on the surface is oxidized by heating to a high temperature of 800° C. or higher, and thus a scale (oxide) is generated. Therefore, a step of removing the scale (descaling step) is required after the hot pressing, so that the productivity deteriorates. Furthermore, in a member or the like that requires corrosion resistance, the member surface after processing is required to be subjected to antirust treatment or metal coating, and therefore a surface cleaning step and a surface treatment step are required, so that the productivity deteriorates.

As an example of a method for suppressing such deterioration of productivity, a method in which a steel sheet before hot stamping is subjected to coating such as plating to enhance the corrosion resistance and omit a descaling step is considered. In coating on steel sheets, various materials such as organic materials and inorganic materials are generally used. Among them, zinc plating having a sacrificial protection effect is often applied to steel sheets from the viewpoints of the anticorrosion performance and steel sheet production technology.

For example, Patent Document 1 discloses a hot-pressed steel sheet member including a chemical composition containing, in mass %, C: 0.30% or more and less than 0.50%. Si: 0.01% or more and 2.0% or less, Mn: 0.5% or more and 3.5% or less, Sb: 0.001% or more and 0.020% or less, P: 0.05% or less, S: 0.01% or less, Al: 0.01% or more and 1.00% or less, and N: 0.01% or less, with the remainder being Fe and inevitable impurities; a microstructure in which an average grain size of prior austenite grains is 8 μm or less, a volume percentage of martensite is 90% or more, and a solute C content is 25% or less of a total C content; a tensile strength of 1780 MPa or more; and a surface further having an Al-plated layer or a Zn-plated layer. Patent Document 1 discloses that applying a plated layer to a surface of a steel sheet can prevent oxidation of the sheet surface caused by hot pressing and improve the corrosion resistance of the hot-pressed steel sheet member.

CITATION LIST

Patent Document

Patent Document 1
  PCT International Publication No. WO 2019/093384

SUMMARY OF INVENTION

Problems to be Solved by the Invention

As described above, oxidation of the surface of a steel sheet caused by hot pressing has been prevented and the corrosion resistance of the steel member after hot pressing has been improved by forming a plated layer containing Zn (zinc-plated layer) on the sheet surface.

When such a plated steel sheet having a zinc-plated layer is heated to a high temperature by hot stamping, welding, or the like, a part of Zn is evaporated, and the remaining Zn (zinc) is alloyed with Fe diffused from the steel sheet as a substrate. In a Fe—Zn alloy formed by alloying in such a state, red rust is easily generated at an early stage of corrosion.

However, Patent Document 1 does not describe a study on red rust.

Therefore, an object of the present invention is to provide a plated steel sheet that can ensure excellent red rust resistance even when exposed to a high temperature by hot stamping, welding, or the like on the premise of a plated steel sheet having a Zn-containing plated layer.

Means for Solving the Problem

The present inventors conducted studies to obtain a plated steel sheet that can ensure excellent red rust resistance even when exposed to a high temperature by hot stamping, welding, or the like. As a result, the present inventors have found that even in a plated layer containing Zn, red rust resistance is improved if a predetermined amount of Se is contained and an intermetallic compound containing Sc is formed.

The present invention has been made in view of the above findings. The gist of the present invention is as follows.

[1] A plated steel sheet according to an aspect of the present invention includes a base steel sheet, a plated layer formed on a surface of the base steel sheet, and an oxide film formed on a surface of the plated layer, in which the plated layer has a chemical composition containing, in mass %, Sc: 0.000010 to 4.0%, Al: 0 to 93.0%, Fe: 0 to 15.0%, Si: 0 to 20.0%, Mg: 0 to 3.0%, Ca: 0 to 3.0%, La: 0 to 0.5%, Ce: 0 to 0.5%, Y: 0 to 0.5%, Cr: 0 to 1.0%, Ti: 0 to 1.0%, Ni: 0 to 1.0%, Co: 0 to 0.25%, V: 0 to 0.25% c, Nb: 0 to 1.0%, Cu: 0 to 1.0%, Mn: 0 to 1.0%, Sr: 0 to 0.5%, Sb: 0 to 0.5%, Pb: 0 to 0.5%, B: 0 to 0.5%, Li: 0 to 1.0%, Zr: 0 to 1.0%, Mo: 0 to 1.0%, W: 0 to 0.5%, Ag: 0 to 1.0%, P: 0 to 0.5%, Sn: 0 to 1.0%, Bi: 0 to 1.0%, In: 0 to 1.0%, and a remainder: 7.0% or more of Zn, and impurities, a total content of Mg, Ca, La, Ce, Y, Cr, Ti, Ni, Co, V, Nb, Cu, Mn, Sr, Sb, Pb, B, Li, Zr, Mo, W, Ag, P, Sn, Bi, and In is 0 to 5.0%, in a cross section of the plated layer in a thickness direction, an area fraction of an intermetallic compound phase containing Sc and having an equivalent circle diameter of 5.0 μm or less is 0.1 to 10.0%, and a thickness of the oxide film is 10 nm or more.

[2] In the plated steel sheet described in [1], the chemical composition of the plated layer may contain, in mass %, Al: 19.0 to 93.0% and Sc: 0.00050 to 0.30%.

[3] In the plated steel sheet described in [1], the chemical composition of the plated layer may contain, in mass %, Al: 19.0 to 93.0% v and Sc: 0.010 to 0.30%, and in the cross section of the plated layer in the thickness direction, the area fraction of the intermetallic compound phase may be 1.0 to 10.0%.

Effects of the Invention

According to the above-described aspect of the present invention, a plated steel sheet having a Zn-containing plated layer can be provided, and the plated steel sheet can ensure excellent red rust resistance even when exposed to a high temperature by hot stamping, welding, or the like.

BRIEF DESCRIPTION OF THE DRAWING

FIG. 1 is a schematic view showing an example of a cross section of a plated steel sheet in the thickness direction according to the present embodiment.

EMBODIMENTS OF THE INVENTION

A plated steel sheet according to an embodiment of the present invention (plated steel sheet according to the present embodiment) will be described.

As shown in FIG. 1, plated steel sheet 1 according to the present embodiment includes a base steel sheet 10, a plated layer 20 formed on a surface of the base steel sheet 10, and an oxide film 30 formed on a surface of the plated layer. In the plated steel sheet 1 according to the present embodiment, the chemical composition of the plated layer 20 contains Sc: 0.000010 to 4.0% in mass %, and may contain Al, Fe, and Si as necessary. Furthermore, one or more selected from the group consisting of Mg, Ca, La, Ce, Y, Cr, Ti, Ni, Co, V Nb, Cu, Mn, Sr, Sb, Pb, B, Li, Zr, Mo, W, Ag, P, Sn, Bi, and In may be further contained in the range of 5.0% or less in total, as necessary. The remainder of the chemical composition is Zn and impurities.

In the plated steel sheet 1 according to the present embodiment, in a cross section, in the thickness direction, an intermetallic compound phase 21 containing Sc and having an equivalent circle diameter of 5.0 μm or less is present at a predetermined area fraction. In addition, a thickness of the oxide film 30 is 10 nm or more.

Each reason for limitation will be described below.

[Base Steel Sheet]

In the plated steel sheet 1 according to the present embodiment, the plated layer is important, and the kind of the base steel sheet 10 is not particularly limited and is to be determined according to the product to which the base steel sheet 10 is to be applied, the required strength, the required sheet thickness, and the like. As the base steel sheet, for example, a hot-rolled mild steel sheet described in JIS G3131: 2018 or a cold-rolled steel sheet described in JIS G3141: 2021 can be used.

[Plated Layer]

The plated steel sheet 1 according to the present embodiment includes the plated layer 20 on at least a part of the surface of the base steel sheet 10. In FIG. 1, the plated layer 20 is formed on one surface of the base steel sheet 10, but the plated layer 20 may be formed on both surfaces of the base steel sheet 10.

<Chemical Composition>

The chemical composition of the plated layer 20 of the plated steel sheet 1 according to the present embodiment will be described. Hereinafter, the unit "%" of the amount of each element means mass %.

Se: 0.000010 to 4.0%

Sc is an important element in the plated layer 20 of the plated steel sheet 1 according to the present embodiment.

When a plated steel sheet having a zinc-plated layer is heated to a high temperature by hot stamping, welding, or the like, a part of Zn is evaporated. However, if the plated layer 20 contains 0.000010% or more of Sc, evaporation of Zn at a high temperature is suppressed. The suppression of evaporation of Zn leads to suppression of a decrease in the Zn content in a Zn—Fe alloy formed on the surface by the heating to a high temperature, and after the heating to a high temperature, the red rust resistance is improved.

Conventionally, even if a raw material contains a trace amount of Sc as an impurity, the Sc is removed by refining. Therefore, almost no Sc is contained in a plated layer of a conventional plated steel sheet. It has been confirmed that even in a rare case where Sc is contained as an impurity, the Sc content is 0.000004% (0.04 ppm) or less. However, the present inventors have newly found that if 0.000010% (0.10 ppm) or more of Sc is contained, evaporation of Zn is suppressed.

The mechanism of suppressing evaporation of Zn by contained Sc in the case of heating to a high temperature is not yet clear, but in an environment containing oxygen such as the atmosphere, a thin oxide film containing a Zn oxide (and an Al oxide in a case where Al is contained) is formed on the surface of a plated layer after plating. It is assumed that when the temperature is raised by heating or the like, Sc moves into the oxide film, the oxide film is modified, and thus suppresses evaporation of Zn.

If the Se content in the plated layer is less than 0.000010%, the above-described effect is not obtained. Therefore, the Sc content is 0.000010% or more. The Sc content is preferably 0.000050% or more, 0.00010% or more, 0.00025% or more, or 0.00050% or more, and more preferably 0.010% or more, 0.025% or more, or 0.050% or more.

Meanwhile, even if the Sc content is more than 4.0%, the effect is saturated, and in addition, the cost is increased. Therefore, the Sc content is 4.0% or less. The Sc content may be 2.0% or less, 1.00% or less, or 0.60% or less, as necessary. If the Sc content is more than 0.30%, initial make-up of plating bath may be difficult, and therefore the Sc content may be 0.30% or less.

The above-described effect is remarkable in a case where most of Sc is present as an intermetallic compound phase having a predetermined equivalent circle diameter as described below.

Al: 0 to 93.0%

Al is an element effective for improving the corrosion resistance in a plated layer containing aluminum (Al) and zinc (Zn). Al contributes to formation of an alloy layer (Al—Fe alloy layer) and is also an element effective for improving plating adhesion. The Al content may be 0%, or Al may be contained in order to obtain the above-described effect sufficiently. In the case of obtaining the above-described effect, the Al content is preferably 5.0% or more, and more preferably 10.0% or more, or 15.0% or more. Al is also an element that forms a strong oxide film on a surface of the plated layer and, in a case where Sc is simultaneously contained, has an effect of suppressing evaporation of Zn. In the case of obtaining this effect, the Al content is preferably 19.0% or more, 25.0% or more, or 30.0% or more.

Meanwhile, if the Al content is more than 93.0%, the Zn content is excessively low, and the red rust resistance deteriorates. Therefore, the Al content is 93.0% or less. The Al content is preferably 90.0% or less, 85.0% or less, 80.0% or less, 75.0% or less, or 70.0% or less. The Al content is more preferably 65.0% or less, 60.0% or less, or 55.0% or less.

Fe: 0 to 15.0%

Fe may be diffused from a base sheet for plating to a plated layer during manufacture and thus may be contained in the plated layer. In particular in the case of hot-dip plating, Fe may be contained at a content up to 15.0%, and if the Fe content is 15.0% or less, the influence on the red rust resistance is small. Therefore, the Fe content is 15.0% or less. The Fe content is preferably 12.0% or less, 10.0% or less, 8.0% or less, 6.0% or less, 4.0% or less, or 2.0% or less.

Si: 0 to 20.0%

In formation of a plated layer on a steel sheet, Si is an element that has an effect of suppressing formation of an excessively thick alloy layer between the steel sheet and the plated layer and thus enhancing the adhesion between the steel sheet and the plated layer. In a case where Si is contained together with Mg, Si is also an element that forms a compound with Mg to contribute to improvement of the corrosion resistance after coating. Therefore, Si may be contained.

The Si content may be 0%, but in the case of obtaining the above-described effect, the Si content is preferably 0.05% or more. The Si content is more preferably 0.5% or more, and still more preferably 1.0% or more.

Meanwhile, if the Si content is more than 20.0%, a large amount of Si is contained in an intermetallic compound containing Sc, so that the melting point of the intermetallic compound phase containing Sc is raised. In this case, even if the plated steel sheet is exposed to a high temperature, the intermetallic compound containing Sc does not melt. As a result, a sufficient effect of suppressing evaporation of Zn by Sc cannot be obtained. Therefore, the Si content is 20.0% or less. From the viewpoint of workability of the plated layer, the Si content may be 17.0% or less, 13% or less, 10.0% or less, 8.0% or less, 6.0% or less, 4.0% or less, or 2.5% or less.

The remainder of the chemical composition of the plated layer of the plated steel sheet 1 according to the present embodiment may be Zn and impurities other than the above-described elements. However, the chemical composition may contain one or more selected from the group consisting of Mg, Ca, La, Ce, Y, Cr, Ti, Ni, Co, V, Nb, Cu, Mn, Sr, Sb, Pb, B, Li, Zr, Mo, W, Ag, P, Sn, Bi, and In in the following ranges, respectively, and in the range of 5.0% or less in total for the purpose of, for example, improving various properties, or as an impurity. These elements may be not contained, and therefore the lower limit of the amount of each of these elements is 0%.

In the plated steel sheet according to the present embodiment, the Zn content is 7.0% or more as a range in which an effect of improving the red rust resistance can be clearly obtained. The Zn content is preferably 8.0% or more, 10.0% or less, 15.0% or more, 18.0% or more, 21.0% or more, 25.0%, 30.0% or more, or 35.0% or more. The upper limit of the Zn content is 100%. The Zn content may be 95.0% or less, 90.0% or less, 85.0% or less, 81.0% or less, 75.0% or less, 70.0% or less, 65.0% or less, 60.0% or less, or 55.0% or less, as necessary.

Mg: 0 to 3.0%

Mg is an element having an effect of enhancing the corrosion resistance of the plated layer. Therefore, Mg may be contained.

Meanwhile, if the Mg content is more than 3.0%, the workability of the plated layer deteriorates. In addition, a manufacture-related problem is caused such as an increase in amount of dross generated in a plating bath. Therefore, the Mg content is 3.0% or less. The Mg content may be 2.0% or less, 1.0% or less, 0.5% or less, or 0.2% or less.

Ca: 0 to 3.0%

Ca contained in the plated layer is an element that decreases the amount of formed dross, which is likely to be formed during plating operation as the Mg content increases, and improves plating manufacturability. Therefore, Ca may be contained.

Meanwhile, if the Ca content is high, a Ca-based intermetallic compound such as a $CaZn_{11}$ phase is generated in the plated layer, and the corrosion resistance deteriorates. Therefore, the Ca content is 3.0% or less. The Ca content may be 2.0% or less, 1.0% or less, 0.5% or less, or 0.2% or less.

La: 0 to 0.5%
Ce: 0 to 0.5%
Y: 0 to 0.5%

If the La content, the Ce content, and the Y content are excessive, the viscosity of the plating bath is increased, and initial make-up of plating bath itself may be difficult. Therefore, the La content, the Ce content, and the Y content are each 0.5% v or less. The La content, the Ce content, and the Y content may be each 0.2% or less or 0.1% or less.

Cr: 0 to 1.0%
Ti: 0 to 1.0%
Ni: 0 to 1.0%
Co: 0 to 0.25%
V: 0 to 0.25%
Nb: 0 to 1.0%
Cu: 0 to 1.0%
Mn: 0 to 1.0%
Sr: 0 to 0.5%
Sb: 0 to 0.5%
Pb: 0 to 0.5%

B: 0 to 0.5%
Li: 0 to 1.0%
Zr: 0 to 1.0%
Mo: 0 to 1.0%
W: 0 to 0.5%
Ag: 0 to 1.0%
P: 0 to 0.5%

These elements substitute for Al, Zn, or the like in the plated layer and shift the potential to an electropositive potential and thus have an effect of improving the corrosion resistance in the acid side. Therefore, these elements may be contained.

Meanwhile, if these elements are excessive, an intermetallic compound including these elements is formed and a concern of deterioration of the corrosion resistance in the acid side and/or the alkali side is caused. Therefore, the amounts of Cr, Ti, Ni, Nb, Cu, Mn, Li, Zr, Mo, and Ag are each 1.0% or less, the amounts of Co and V are each 0.25% or less, and the amounts of Sr, Sb, Pb, B, W, and P are each 0.5% or less. The amounts of Cr, Ti, Ni, Nb, Cu, Mn, Li, Zr, Mo, and Ag may be each 0.5% or less, 0.3% or less, or 0.2% or less. The amounts of Co and V may be each 0.10% or less, 0.05% or less, or 0.03% or less. The amounts of Sr, Sb, Pb, B, W, and P may be each 0.2% or less or 0.1% or less.

Sn: 0 to 1.0%

Sn is an element that increases the Mg elution rate in the plated layer containing Zn, Al, and Mg. Sn is also an element that forms an intermetallic compound that significantly improves the acid/alkali corrosion resistance in plating. Therefore, Sn may be contained.

Meanwhile, if the Mg elution rate is increased, the corrosion resistance of a flat portion deteriorates. Furthermore, the corrosion resistance in the acid side significantly deteriorates. Therefore, the Sn content is 1.0% or less. The Sn content may be 0.5% or less, 0.3% or less, or 0.2% or less.

Bi: 0 to 1.0%
In: 0 to 1.0%

Bi and In are each an element that forms an intermetallic compound that improves the alkali corrosion resistance. Therefore, Bi and In may be contained.

Meanwhile, if the Bi content and the in content are each more than 1.0%, the corrosion resistance in the acid side significantly deteriorates. Therefore, the Bi content and the In content are each 1.0% or less. The Bi content and the In content may be each 0.5% or less, 0.3% or less, or 0.2% or less.

Even in the above-described range of the amount of each element, that is, each of Mg, Ca, La, Ce, Y, Cr, Ti, Ni, Co, V, Nb, Cu, Mn, Sr, Sb, Pb, B, Li, Zr, Mo, W, Ag, P, Sn, Bi, and In described above, if the total amount is more than 5.0%, the corrosion resistance in the acid side and/or the alkali side deteriorates, or the viscosity of the plating bath is increased and thus initial make-up of plating bath itself may be difficult. Therefore, the total amount of these elements is 0 to 5.0%.

The chemical composition of the plated layer 20 is measured with the following method.

First, an acid solution in which the plated layer is peeled off and dissolved with an acid containing an inhibitor that suppresses corrosion of a base metal (steel) (for example, an acid obtained by adding 1% of HIBIRON (A-6) (manufactured by Sugimura Chemical Industrial Co., Ltd.) to 10% hydrochloric acid) is obtained. Next, the obtained acid solution is measured by ICP analysis, and thus the chemical composition of the plated layer 20 can be obtained.

<Microstructure>

In a cross section in the thickness direction of the plated layer 20 of the plated steel sheet 1 according to the present embodiment, the area fraction of an intermetallic compound phase containing Sc and having an equivalent circle diameter (circle equivalent diameter) of 5.0 μm or less is 0.1 to 10.0%.

The intermetallic compound phase having an equivalent circle diameter of 5.0 μm or less can be in contact with the surrounding T-Zn phase, and acts to suppress evaporation of Zn more effectively than an intermetallic compound phase solute in an α-Al phase or an intermetallic compound phase having a large equivalent circle diameter. If the area fraction of the intermetallic compound phase containing Sc and having an equivalent circle diameter of 5.0 μm or less is 0.1% or more, the above-described effect can be sufficiently obtained, and the red rust resistance is improved. The area fraction of the intermetallic compound phase containing Sc and having an equivalent circle diameter of 5.0 μm or less is more preferably 1.0% or more. The lower limit of the equivalent circle diameter of the target intermetallic compound phase is not limited, but the target is preferably an intermetallic compound phase of 0.1 μm or more from the viewpoint of measurement accuracy.

Meanwhile, in order that the area fraction of the intermetallic compound phase containing Sc and having an equivalent circle diameter of 5.0 μm or less is more than 10.0%, more than 4.0% of Sc is to be contained, and the cost is increased. Therefore, the area fraction of the intermetallic compound phase containing Sc and having an equivalent circle diameter of 5.0 μm or less is 10.0% or less.

The area fraction of the intermetallic compound phase containing Sc and having an equivalent circle diameter of 5.0 μm or less can be controlled by the Sc content and cooling conditions after plating described below.

The area fraction of the intermetallic compound phase containing Sc and having an equivalent circle diameter of 5.0 μm or less (region having an equivalent circle diameter in the range of 5.0 μm or less and containing 3.0 mass % or more of Sc) in the cross section of the plated layer can be determined with the following method.

Five samples are collected so that a cross section in the thickness direction of the plated layer can be observed. In these samples, a visual field is set to a rectangular range of 100 μm in the thickness direction and 500 μm in the direction perpendicular to the thickness direction, and 5 visual fields in total are photographed at a magnification of 1500 times using EDS to obtain mapping images. At this time, the spot diameter is to be 1 to 10 nm, the voltage is to be 15 kV, and the current is to be 10 nA.

From the Sc element distribution image of the obtained mapping image, the area fraction of the region having an equivalent circle diameter in the range of 5.0 μm or less and containing 3.0 mass % or more of Sc with respect to the observed visual field is determined using the function "Analyze" of image analysis software "ImageJ". The average of the area fraction of the five visual fields is calculated and regarded as the area fraction of the intermetallic compound phase containing Sc and having an equivalent circle diameter of 5.0 μm or less.

<Adhesion Amount>

The adhesion amount per one surface of the plated layer (hereinafter, the amount simply referred to as adhesion amount means the adhesion amount per one surface) is preferably 20 to 160 g/m$^2$.

If the adhesion amount of the plated layer is less than 20 g/m$^2$, sufficient corrosion resistance may be not obtained. Meanwhile, if the adhesion amount is more than 160 g/m$^2$, the adhesion of the plated layer deteriorates, and the plating may be peeled off. The adhesion amount of the plated layer may be 30 g/m² or more, 40 g/m² or more, 50 g/m² or more, or 60 g/m² or more, and may be 140 g/m² or less, 120 g/m² or less, 100 g/m² or less, or 90 g/m² or less.

The adhesion amount can be measured with the following method.

A sample of 30 mm×30 mm is collected from the plated steel sheet, the plated layer of this sample is peeled off and dissolved with an acid containing an inhibitor that suppresses corrosion of a base metal (steel) (for example, an acid obtained by adding 1% of HIBIRON (A-6) (manufactured by Sugimura Chemical Industrial Co., Ltd.) to 10% hydrochloric acid), the weight change of the plated steel sheet after the peeling and dissolving is measured, and the adhesion amount is calculated from the result.

[Oxide Film]

In the plated steel sheet according to the present embodiment, an oxide film is present on a surface of the plated layer, and the oxide film has a thickness of 10 nm or more. The oxide film can suppress evaporation of Zn when the temperature of the plated steel sheet becomes high during hot stamping or the like.

If the thickness of the oxide film is less than 10 nm, evaporation of Zn cannot be suppressed, and as a result, the red rust resistance deteriorates. The thickness of the oxide film is preferably 11 nm or more, and more preferably 12 nm or more.

The upper limit of the thickness of the oxide film is not limited, but the thickness of the oxide film may be 50 nm or less, 30 nm or less, or 20 nm or less.

This oxide film contains a Zn oxide (and an Al oxide in a case where Al is contained) formed by exposing a plated layer after plating to an environment containing oxygen such as the atmosphere.

The thickness of the oxide film is determined with a method in which a high-frequency glow discharge optical emission spectrometer (GDS) is used.

Specifically, the surface of a test piece is brought into an Ar atmosphere, and in a state where glow plasma is generated, the test piece is analyzed in the depth direction while the surface is subjected to sputtering. In the glow plasma, atoms are excited to emit an emission spectrum specific to the element, and from the wavelength of the emission spectrum, the element is identified and the emission intensity of the identified element is estimated.

The data in the depth direction is estimated from the sputtering time. The relation between the sputtering time and the sputtering depth is obtained in advance using a reference sample, and thus the sputtering time is converted into the sputtering depth. The depth from the surface is defined as the sputtering depth converted from the sputtering time. The obtained emission intensity is converted to mass % with a calibration curve prepared.

According to the above, the depth from the outermost surface to the position where the O content is 5 mass % is measured. This measurement is performed at three locations, and the average of the depth to the position where the O content is 5 mass % at the three locations is regarded as the thickness of the oxide film.

The sheet thickness of the plated steel sheet according to the present embodiment is not limited, but is preferably 0.5 to 3.0 mm in consideration of application and the like in use.

The plated steel sheet according to the present embodiment has the above-described characteristics, and as a result, is excellent in red rust resistance even when heated to a high temperature by welding, hot stamping, or the like.

[Manufacturing Method]

An effect of the plated steel sheet according to the present embodiment can be obtained regardless of the manufacturing method as long as the plated steel sheet has the above-described characteristics, and the plated steel sheet can be manufactured through a step of forming a plated layer containing Sc (plated layer forming step).

Hereinafter, preferred conditions will be described.

<Plated Layer Forming Step>

The method for forming a plated layer is not limited, and examples of the method include a hot-dip plating method.

A hot-dip plating method can be employed that includes (I) to (III):
 (I) immersing a steel sheet (base sheet for plating) in a hot-dip plating bath containing Sc;
 (II) pulling the steel sheet up from the plating bath, and controlling the adhesion amount with a wiping gas or the like; and
 (III) cooling to room temperature.

(1) Immersing in Plating Bath

A steel sheet is immersed in a hot-dip plating bath containing Sc to form a plated layer on the surface of the steel sheet. The chemical composition of the plating bath is to contain, for example, 0.000010 to 4.0% of Sc, and further contain Al, Si, Mg, Ca, La, Ce, Y, Cr, Ti, Ni, Co, V, Nb, Cu, Mn, Sr, Sb, Pb, B, Li, Zr, Mo, W, Ag, P, Sn, Bi, and In according to the chemical composition of a plated layer to be finally obtained, and the remainder is to be Zn and impurities.

The steel sheet before the immersion in the plating bath may be subjected to heat reduction treatment. For example, for a steel sheet before immersion in a plating bath, the surface of the base sheet for plating is subjected to heat reduction treatment at 800° C. in an $N_2$-5% $H_2$ gas atmosphere in a furnace having an oxygen concentration of 20 ppm or less, and air-cooled with an $N_2$ gas, and after the temperature of the sheet for immersion reaches a bath temperature+20° C., the steel sheet is immersed in a plating bath. The immersion time in the plating bath is preferably about 1 to 10 seconds.

(II) Pulling Up

The steel sheet after the immersion in the plating bath in (I) is pulled up from the plating bath, and the plating adhesion amount is controlled with a wiping gas such as an $N_2$ gas.

(III) Cooling

The steel sheet in which the adhesion amount of the plated layer is controlled is cooled to room temperature. By this cooling a fine intermetallic compound phase containing fine Sc is crystallized.

Specifically, the average cooling rate from the bath temperature to (the bath temperature—50° C.) is set to 5° C./sec or less, and the average cooling rate from (the bath temperature—50° C.) to 100° C. is set to 20° C./sec or more to promote formation of an intermetallic compound containing Sc and having an equivalent circle diameter of 5.0 μm or less.

If the average cooling rate from the bath temperature to (the bath temperature—50° C.) is more than 5° C./sec, Sc is in a solute state in an α-Al phase. The Sc solute in the α-Al phase does not crystallize as an intermetallic compound phase. Therefore, the average cooling rate from the bath temperature to (the bath temperature—50° C.) is set to 5° C./sec or less so that Sc is not solute in the α-Al phase.

Thereafter, Sc not solute in the α-Al phase during cooling from the bath temperature to (the bath temperature—50° C.) is concentrated in a Zn-based liquid phase, and is crystallized as a fine intermetallic compound phase by cooling at an average cooling rate of 20° C./sec or more from (the bath temperature—50° C.) to 100° C. If the average cooling rate from (the bath temperature—50° C.) to 100° C. is less than 20° C./sec, a coarse intermetallic compound is crystallized, and the number density of Sc-containing intermetallic compounds having an equivalent circle diameter of 5.0 μm or less is decreased.

A technique is also conventionally proposed in which an acidic solution is adhered to a surface of a plated steel sheet to form a pattern portion. Although the detailed mechanism is unknown, in the plated steel sheet according to the present embodiment, if an acidic solution is applied, the oxide film on the surface is dissolved and thus Zn evaporation cannot be prevented, and therefore an acidic solution is not adhered.

The steel sheet to be subjected to the plated layer forming step is not limited, and is to be a known hot-rolled steel sheet or cold-rolled steel sheet.

By subjecting the plated steel sheet according to the present embodiment obtained by the above method to hot stamping, a hot-stamped product can be obtained. This hot-stamped product is excellent in red rust resistance.

The conditions when the hot-stamped product is obtained may be known conditions. For example, the plated steel sheet according to the present embodiment is to be heated to 900° C., held for 100 seconds, and then formed and simultaneously cooled rapidly with a die.

EXAMPLES

Hereinafter, Examples of the present invention will be described. Examples described below are merely examples of the present invention, and do not limit the present invention.

A steel sheet containing C: 0.2 mass % and Mn: 1.3 mass % and having a sheet thickness of 1.6 mm was used as a base sheet for plating.

The base sheet for plating was cut into 100 mm×200 mm, and then subjected to plating using a batch type hot-dip plating test apparatus.

At the time of forming a plated layer, the surface of the base sheet for plating before immersion in a plating bath was subjected to heat reduction treatment at 800° C. in an $N_2$-5% $H_2$ gas atmosphere in a furnace having an oxygen concentration of 20 ppm or less, and air-cooled with an $N_2$ gas, and after the temperature of the sheet for immersion reached the bath temperature+20° C., the base sheet was immersed in a plating bath at a temperature described in Table 1 for 3 seconds.

After immersion in the plating bath, the steel sheet was pulled up at a pulling speed of 20 to 200 mm/sec. At the time of pulling up, the plating adhesion amount was controlled to a value shown in Table 1 with an $N_2$ wiping gas.

After pulled up from the plating bath, the steel sheet was cooled from the plating bath temperature to room temperature under the conditions shown in Table 2. Thus, plated steel sheets Nos. 1 to 34 were manufactured. To the plated steel sheet No. 34, an acidic solution was applied.

In each step, the sheet temperature was measured using a thermocouple spot-welded to the central part of the base sheet for plating.

A sample having a size of 30 mm×30 mm was collected from the obtained plated steel sheet, and this sample was immersed in a 10% HCl aqueous solution to which 1% of HIBIRON (A-6) was added to pickle and peel off the plated layer. Thereafter, elements eluted in the aqueous solution were subjected to ICP analysis to measure the chemical composition of the plated layer. The chemical composition of the plated layer was as shown in Table 1. The A value in Table 1 is the total amount of Mg, Ca, La, Ce, Y, Cr, Ti, Ni, Co, V, Nb, Cu, Mn, Sr, Sb, Pb, B, Li, Zr, Mo, W, Ag, P, Sn, Bi, and In.

In the plated steel sheet, the area fraction of the intermetallic compound phase containing Sc and having an equivalent circle diameter of 5.0 μm or less (region having an equivalent circle diameter in the range of 5.0 μm or less and containing 3.0 mass % or more of Sc) in the cross section of the plated layer was measured with the above-described method.

Furthermore, the thickness of the oxide film was measured with the above-described method using a GDS.

Next, the obtained plated steel sheet was subjected to heat treatment assuming hot stamping. Specifically, the plated steel sheet was put in a heating furnace in which the furnace temperature was set to 900° C. and thus heated, and after the temperature of the plated steel sheet reached the furnace temperature—10° C., the plated steel sheet was held at the temperature for 100 seconds, then taken out from the furnace, put into a flat sheet die at a temperature of about room temperature, and thus cooled to around room temperature rapidly.

The red rust resistance of the plated steel sheet after heating and rapid cooling (after hot stamping) was evaluated with the following method.

That is, a sample having a size of 50×100 mm was collected from the plated steel sheet after heating and rapid cooling, and subjected to Zn phosphate treatment in accordance with the SD5350 system (standard by Nippon Paint Industrial Coatings Co., Ltd.). Thereafter, electrodeposition coating (PN110 POWERNICS GRAY: standard by Nippon Paint Industrial Coatings Co., Ltd.) was applied so as to have a thickness of 20 μm, and baking was performed at a baking temperature of 150° C. for 20 minutes.

Thereafter, the center of the sample was cut up to the base metal, and the sample was subjected to a cyclic corrosion test in accordance with the cyclic neutral salt spray test method described in 8.1 of JIS H 8502: 1999 to measure the number of cycles at which red rust was generated from the cut portion.

The evaluation result of the red rust resistance was "AAA" in a case where the number of cycles at which red rust was generated was more than 180, "AA" in a case where the number was 180 or less and more than 120, "A" in a case where the number was 60 to 120, and "B" in a case where the number was less than 60, and the red rust resistance was determined to be excellent if the evaluation result was "AAA", "AA", or "A".

As can be seen from Tables 1 and 2, in the invention examples in which the chemical composition of the plated layer, the area fraction of the intermetallic compound phase containing Sc and having an equivalent circle diameter of 5.0 μm or less, and the thickness of the oxide film were within the range described in the present invention, the red rust resistance was excellent.

Meanwhile, in a case where Sc was not contained in the plated layer (No. 1) and in a case where the Sc content was low (No. 7), the area fraction of the intermetallic compound phase containing Sc and having an equivalent circle diameter of 5.0 μm or less was low, and the red rust resistance was not sufficient.

In a case where the Al content in the plated layer was excessive (No. 6), the area fraction of the intermetallic compound phase containing Sc and having an equivalent circle diameter of 5.0 μm or less was low, and the red rust resistance was not sufficient.

In a case where the Si content in the plated layer was excessive (No. 28), the red rust resistance was not sufficient. The reason for the above-described results is considered as follows. In a case where a large amount of Si was contained in the intermetallic compound containing Sc, the melting point of the intermetallic compound phase containing Sc was raised, and even when the plated steel sheet was exposed to a high temperature, the intermetallic compound containing Sc did not melt, and a sufficient effect of suppressing evaporation of Zn was not exhibited.

Even if the chemical composition of the plated layer was in a preferable range, in cases where the cooling conditions after immersion in a plating bath were not preferable (No. 15, No. 24, No. 31), the area fraction of the intermetallic compound phase containing Sc and having an equivalent circle diameter of 5.0 μm or less was low, and the red rust resistance was not sufficient.

In a case where an acid solution was applied (No. 34), the thickness of the oxide film was small, and the red rust resistance was not sufficient.

TABLE 1

| No | Zn | Al | Si | Fe | Sc | Element 1 | (mass %) | Element 2 | (mass %) | A value | Plating bath temperature ° C. | Plating adhesion amount (g/m²) |
|---|---|---|---|---|---|---|---|---|---|---|---|---|
| 1 | 99.0 | 00.0 | 0.0 | 1.0 | 0.000000 | | | | | | 440 | 65 |
| 2 | 99.0 | 0.0 | 0.0 | 1.0 | 0.000010 | Y | 0.0001 | | | 0.0001 | 440 | 66 |
| 3 | 72.0 | 25.0 | 1.0 | 2.0 | 0.000010 | | | | | | 500 | 65 |
| 4 | 42.0 | 55.0 | 2.0 | 1.0 | 0.000010 | | | | | | 600 | 64 |
| 5 | 8.3 | 90.0 | 0.5 | 1.0 | 0.00010 | Ni | 0.0001 | Cr | 0.2 | 0.2001 | 640 | 60 |
| 6 | 0.5 | 98.0 | 0.0 | 1.5 | 0.000010 | | | | | | 670 | 67 |
| 7 | 93.0 | 5.0 | 1.0 | 1.0 | 0.000005 | | | | | | 430 | 68 |
| 8 | 79.0 | 17.0 | 2.0 | 2.0 | 0.00050 | Cu | 0.001 | V | 0.01 | 0.011 | 400 | 100 |
| 9 | 77.0 | 19.0 | 2.0 | 2.0 | 0.00050 | | | | | | 400 | 90 |
| 10 | 49.0 | 44.0 | 5.0 | 2.0 | 0.00050 | | | | | | 600 | 88 |
| 11 | 20.0 | 79.0 | 0.0 | 1.0 | 0.00050 | Co | 0.0002 | | | 0.0002 | 670 | 25 |
| 12 | 81.0 | 15.0 | 2.0 | 2.0 | 0.0010 | Sn | 0.005 | | | 0.005 | 420 | 160 |
| 13 | 41.8 | 44.0 | 0.0 | 14.0 | 0.0010 | Mn | 0.1 | Li | 0.1 | 0.2 | 610 | 98 |
| 14 | 14.0 | 86.0 | 0.0 | 0.0 | 0.0030 | | | | | | 650 | 59 |
| 15 | 14.0 | 86.0 | 0.0 | 0.0 | 0.0030 | | | | | | 650 | 66 |
| 16 | 10.0 | 90.0 | 0.0 | 0.0 | 0.0050 | Ca | 0.02 | Zr | 0.01 | 0.03 | 620 | 63 |
| 17 | 80.0 | 15.0 | 3.0 | 2.0 | 0.010 | Nb | 0.01 | | | 0.01 | 500 | 130 |
| 18 | 42.0 | 44.0 | 14.0 | 0.0 | 0.010 | Mg | 0.02 | | | 0.02 | 680 | 121 |
| 19 | 10.5 | 70.5 | 19.0 | 0.0 | 0.010 | | | | | | 640 | 155 |
| 20 | 8.0 | 89.0 | 2.0 | 1.0 | 0.010 | Sr | 0.02 | Mo | 0.01 | 0.03 | 680 | 63 |
| 21 | 8.0 | 89.0 | 2.0 | 1.0 | 0.010 | Sr | 0.02 | Mo | 0.01 | 0.03 | 680 | 63 |
| 22 | 85.9 | 10.0 | 2.0 | 2.0 | 0.10 | Ti | 0.001 | | | 0.001 | 500 | 100 |
| 23 | 56.9 | 33.0 | 9.0 | 1.0 | 0.10 | Bi | 0.004 | | | 0.004 | 530 | 96 |
| 24 | 56.9 | 33.0 | 9.0 | 1.0 | 0.10 | | | | | | 530 | 100 |
| 25 | 34.9 | 55.0 | 9.0 | 1.0 | 0.10 | | | | | | 620 | 112 |
| 26 | 18.9 | 68.0 | 13.0 | 0.0 | 0.10 | | | | | | 670 | 124 |
| 27 | 16.9 | 80.0 | 3.0 | 0.0 | 0.10 | B | 0.02 | Ag | 0.003 | 0.023 | 670 | 88 |
| 28 | 33.9 | 45.0 | 21.0 | 0.0 | 0.10 | | | | | | 690 | 67 |
| 29 | 81.7 | 13.0 | 4.0 | 1.0 | 0.30 | La | 0.005 | | | 0.005 | 510 | 90 |
| 30 | 55.7 | 40.0 | 3.0 | 1.0 | 0.30 | Ce | 0.005 | | | 0.005 | 600 | 105 |
| 31 | 32.5 | 60.0 | 0.5 | 7.0 | 0.0050 | | | | | | 620 | 110 |
| 32 | 32.2 | 60.0 | 0.5 | 7.0 | 0.30 | | | | | | 620 | 123 |
| 33 | 12.2 | 85.0 | 0.5 | 2.0 | 0.30 | | | | | | 640 | 71 |
| 34 | 12.2 | 85.0 | 0.5 | 2.0 | 0.30 | | | | | | 640 | 71 |

TABLE 2

| No | Bath temperature to (bath temperature-50° C.) Average cooling rate (° C./s) | (Bath temperature-50° C.) to 100° C. Average cooling rate (° C./s) | Sc-containing intermetallic compound phase having equivalent circle diameter of 5 μm or less (Area %) | Thickness of oxide film (nm) | Performance Red rust resistance | Group |
|---|---|---|---|---|---|---|
| 1 | 5 | 20 | 0.0 | 15 | B | Comparative example |
| 2 | 5 | 20 | 0.1 | 14 | A | Invention example |
| 3 | 5 | 20 | 0.1 | 13 | A | Invention example |
| 4 | 5 | 20 | 0.1 | 11 | A | Invention example |
| 5 | 5 | 20 | 0.1 | 10 | A | Invention example |

TABLE 2-continued

| No | Cooling condition Bath temperature to (bath temperature-50° C.) Average cooling rate (° C./s) | (Bath temperature-50° C.) to 100° C. Average cooling rate (° C./s) | Sc-containing intermetallic compound phase having equivalent circle diameter of 5 μm or less (Area %) | Thickness of oxide film (nm) | Performance Red rust resistance | Group |
|---|---|---|---|---|---|---|
| 6 | 5 | 20 | 0.0 | 10 | B | Comparative example |
| 7 | 5 | 20 | 0.0 | 15 | B | Comparative example |
| 8 | 5 | 20 | 0.1 | 13 | A | Invention example |
| 9 | 5 | 20 | 0.1 | 12 | AA | Invention example |
| 10 | 5 | 20 | 0.2 | 11 | AA | Invention example |
| 11 | 3 | 30 | 0.3 | 10 | AA | Invention example |
| 12 | 5 | 20 | 0.3 | 15 | A | Invention example |
| 13 | 5 | 20 | 0.4 | 11 | AA | Invention example |
| 14 | 5 | 20 | 0.1 | 10 | A | Invention example |
| 15 | 10 | 10 | 0.0 | 10 | B | Comparative example |
| 16 | 5 | 20 | 0.5 | 10 | AA | Invention example |
| 17 | 5 | 20 | 1.0 | 14 | A | Invention example |
| 18 | 5 | 20 | 0.1 | 11 | A | Invention example |
| 19 | 5 | 20 | 1.1 | 10 | AAA | Invention example |
| 20 | 5 | 20 | 0.1 | 10 | A | Invention example |
| 21 | 3 | 30 | 1.2 | 10 | AAA | Invention example |
| 22 | 3 | 30 | 2.5 | 13 | A | Invention example |
| 23 | 5 | 20 | 2.5 | 12 | AAA | Invention example |
| 24 | 5 | 10 | 0.0 | 12 | B | Comparative example |
| 25 | 5 | 20 | 2.6 | 10 | AAA | Invention example |
| 26 | 3 | 20 | 3.0 | 11 | AAA | Invention example |
| 27 | 5 | 20 | 0.1 | 10 | A | Invention example |
| 28 | 5 | 20 | 6.1 | 11 | B | Comparative example |
| 29 | 5 | 20 | 5.0 | 13 | A | Invention example |
| 30 | 5 | 20 | 5.1 | 11 | AAA | Invention example |
| 31 | 10 | 20 | 0.0 | 11 | B | Comparative example |
| 32 | 5 | 20 | 5.2 | 10 | AAA | Invention example |
| 33 | 4 | 20 | 6.0 | 10 | AAA | Invention example |
| 34 | 4 | 20 | 6.0 | 8 | B | Comparative example |

FIELD OF INDUSTRIAL APPLICATION

According to the present invention, a plated steel sheet having a Zn-containing plated layer can be provided, and the plated steel sheet can ensure excellent red rust resistance even when exposed to a high temperature by hot stamping, welding, or the like.

BRIEF DESCRIPTION OF THE REFERENCE SYMBOLS

1 Plated steel sheet
10 Steel sheet
20 Plated layer
21 Sc-containing intermetallic compound phase
30 Oxide film

What is claimed is:
1. A plated steel sheet comprising:
a base steel sheet;
a plated layer formed on a surface of the base steel sheet; and
an oxide film formed on a surface of the plated layer,
wherein, the plated layer has a chemical composition containing, in mass %,

Sc: 0.000010 to 4.0%,
Al: 0 to 93.0%,
Fe: 0 to 15.0%,
Si: 0 to 20.0%,
Mg: 0 to 3.0%,
Ca: 0 to 3.0%,
La: 0 to 0.5%,
Ce: 0 to 0.5%,
Y: 0 to 0.5%,
Cr: 0 to 1.0%,
Ti: 0 to 1.0%,
Ni: 0 to 1.0%,
Co: 0 to 0.25%,
V: 0 to 0.25%,
Nb: 0 to 1.0%,
Cu: 0 to 1.0%,
Mn: 0 to 1.0%,
Sr: 0 to 0.5%,
Sb: 0 to 0.5%,
Pb: 0 to 0.5%,
B: 0 to 0.5%,
Li: 0 to 1.0%,
Zr: 0 to 1.0%,
Mo: 0 to 1.0%,

W: 0 to 0.5%,
Ag: 0 to 1.0%,
P: 0 to 0.5%,
Sn: 0 to 1.0%,
Bi: 0 to 1.0%,
In: 0 to 1.0%, and
a remainder: 7.0% c or more of Zn, and impurities,
a total amount of Mg, Ca, La, Ce, Y, Cr, Ti, Ni, Co, V, Nb, Cu, Mn, Sr, Sb, Pb, B, Li, Zr, Mo, W, Ag, P, Sn, Bi, and In is 0 to 5.0%,
in a cross section of the plated layer in a thickness direction, an area fraction of an intermetallic compound phase containing Sc and having an equivalent circle diameter of 5.0 μm or less is 0.1 to 10.0%, and
a thickness of the oxide film is 10 nm or more.

2. The plated steel sheet according to claim 1, wherein the chemical composition of the plated layer contains, in mass %,
Al: 19.0 to 93.0%, and
Sc: 0.00050 to 0.30%.

3. The plated steel sheet according to claim 1, wherein the chemical composition of the plated layer contains, in mass %,
Al: 19.0 to 93.0%, and
Sc: 0.010 to 0.30%, and
in the cross section of the plated layer in the thickness direction, the area fraction of the intermetallic compound phase is 1.0 to 10.0%.

* * * * *